R. W. SVENNING.
BALL GRINDING MACHINE.
APPLICATION FILED JAN. 10, 1921.

1,404,169.

Patented Jan. 17, 1922.

Inventor
R. W. Svenning,
By Marks & Clerk
Attys.

UNITED STATES PATENT OFFICE.

ROBERT WERNER SVENNING, OF GOTTENBORG, SWEDEN, ASSIGNOR TO NORDISKA KULLAGER AKTIEBOLAGET, OF REGULUSGATAN, GOTTENBORG, SWEDEN.

BALL-GRINDING MACHINE.

1,404,169.  Specification of Letters Patent.  Patented Jan. 17, 1922.

Application filed January 10, 1921. Serial No. 436,352.

*To all whom it may concern:*

Be it known that I, ROBERT WERNER SVENNING, a subject of the King of Sweden, residing at Gottenborg, in the Province of Gottenborg and Bohus, and Kingdom of Sweden, have invented a new and useful Improvement in Ball-Grinding Machines, (for which I have filed applications in Sweden, October 10, 1919, No. 4616/1919; Belgium, October 28, 1920, No. 233399; Holland, October 8, 1920, No. 16775; Switzerland, October 8, 1920, No. 8740; Spain, October 30, 1920; Germany, October 8, 1920, No. 19283; Hungary, October 16, 1920, No. 14161,) of which the following is a specification.

This invention relates to ball grinding machines of the type equipped with a stationary grinding disk and a grooved rotating disk. In this type of machine, when the disks have been in use for a long period, the depth of the grooves in the rotating disk increases, due to wear to such an extent as to impair the efficiency of the machine, thus necessitating the substitution of a new disk or the regrinding or resurfacing of the original one in order to restore the grooves to the proper depth.

The object of the present invention is primarily to overcome the expense and inconvenience necessitated by the substitution of a new disk or the removal of the original one for refinishing purposes, and the invention consists in the provision of a tool which is so arranged in the ball grinding machine as to work against the face of the rotating disk and to cut down the ribs or intervening walls between the grooves as the depth of the latter increases due to wear.

A further object is to locate the cutting tool in the ball mixing chamber of the grinding machine so that the operation of the cutting tool is no way hampered by engagement with the balls being ground.

With the foregoing and other objects in view the invention consists of certain novel features of construction, combination and arrangement of parts as will be hereinafter more fully described and claimed.

Figure 1:
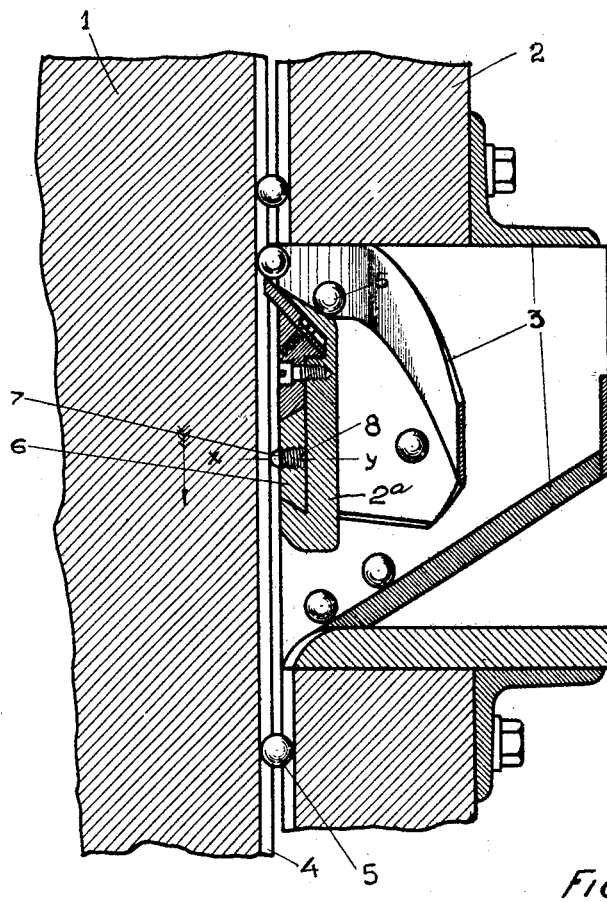
Figure 1 is a fragmentary sectional view through the grinding disks of a well known type of ball grinding machine in the plane of the mixing chamber, showing the invention applied to use.

Referring to the drawing in detail the numeral 1 indicates the rotating grinding disk of a grinding machine which is arranged in operative relation to a stationary disk 2, the latter being equipped with the mixing chamber 3 by which the position of the balls 5 in the grooves 4 of the rotating disk 1 are periodically changed so as to insure maximum efficiency of the machine in operation.

A tool guide $2^a$ is arranged in the mixing chamber 3 and is rigidly supported by the stationary disk 2. The guide is provided with a groove having undercut walls which co-act with the beveled edges of a tool holder 6 and prevent lateral displacement of the latter. The tool holder 6, however, is capable of longitudinal sliding movement in the guide $2^a$ in a direction at right angles to the groove 4 in the rotating disk 1.

The cutting tool 8 consists of a screw threaded in an aperture formed in the holder 6 and provided at the terminal adjacent the rotating disk 1 with a diamond or other cutting element 7.

Figure 2:
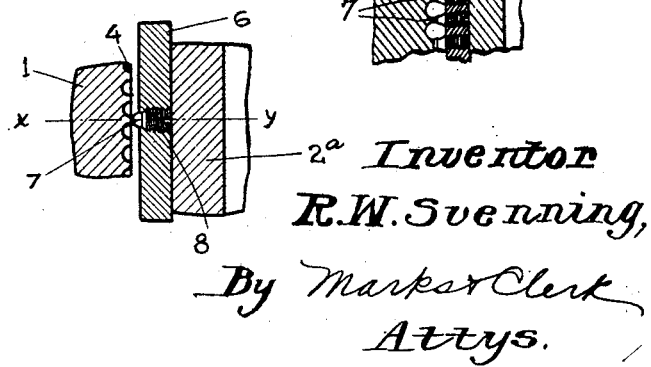
Fig. 2 is a fragmentary sectional view on the line $x-y$ of Fig. 1.

In the form of the invention shown in Figs. 1 and 2 the holder 6 is equipped with a single cutter which is successively brought in operative relation to the ridges or intervening walls confined between the grooves 4 by reciprocating the holder 6 in the guide $2^a$.

Figure 3:
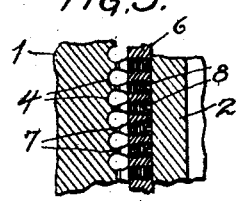
Fig. 3 is a detail view similar to Fig. 2 illustrating a modification of the invention.

In the modification of the invention illustrated in Fig. 3, the holder 6 is provided with a plurality of threaded tool receiving apertures corresponding in number to the number of grooves 4 in the rotating disk 1 and these apertures are properly spaced so as to bring the cutting terminals of the cutters or tools 8 into position to engage the walls or ribs intervening between the grooves 4. In this form of the invention, the holder 6 may be temporarily clamped in its adjusted position and need only be removed in case of necessity of repair or adjustment of the cutter.

What I claim is:

1. In a ball grinding machine, opposed grinding disks, one of said disks having ball receiving grooves therein, a ball mixing chamber on the other disk, and cutting means located in said mixing chamber and arranged to cut down the walls between the grooves in the first mentioned disk to maintain said grooves at a predetermined depth regardless of the amount of wear.

2. In a ball grinding machine, opposed grinding disks, one of said disks being grooved and mounted for rotary movement, means for removing the balls from contact with said rotatable disk, and means located at the point of removal having constant contact with said rotatable disk for maintaining the grooves therein at a predetermined depth.

3. In a ball grinding machine, opposed grinding disks, one of said disks having grooves therein, a mixing chamber, means reciprocally mounted in said mixing chamber movable across the walls between the grooves of said disk for maintaining said grooves at a predetermined depth.

In testimony whereof I have affixed my signature.

ROBERT WERNER SVENNING.